Patented Feb. 8, 1938

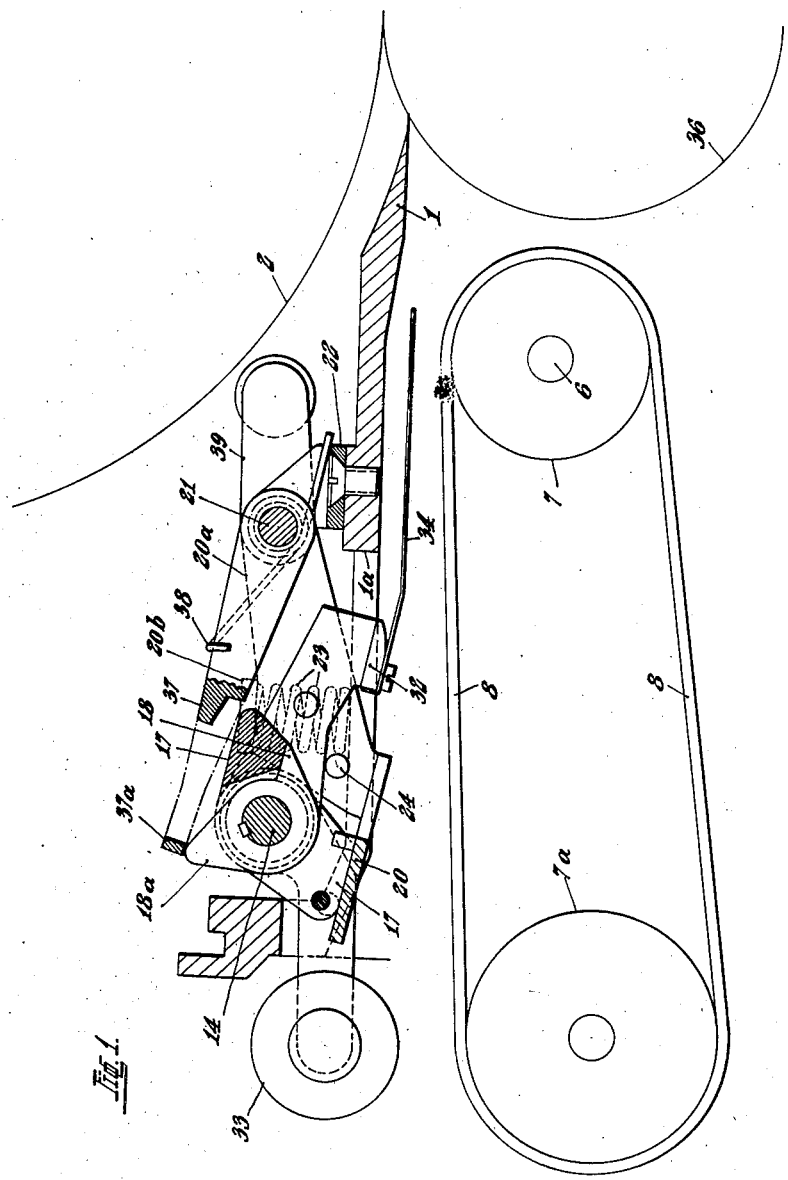

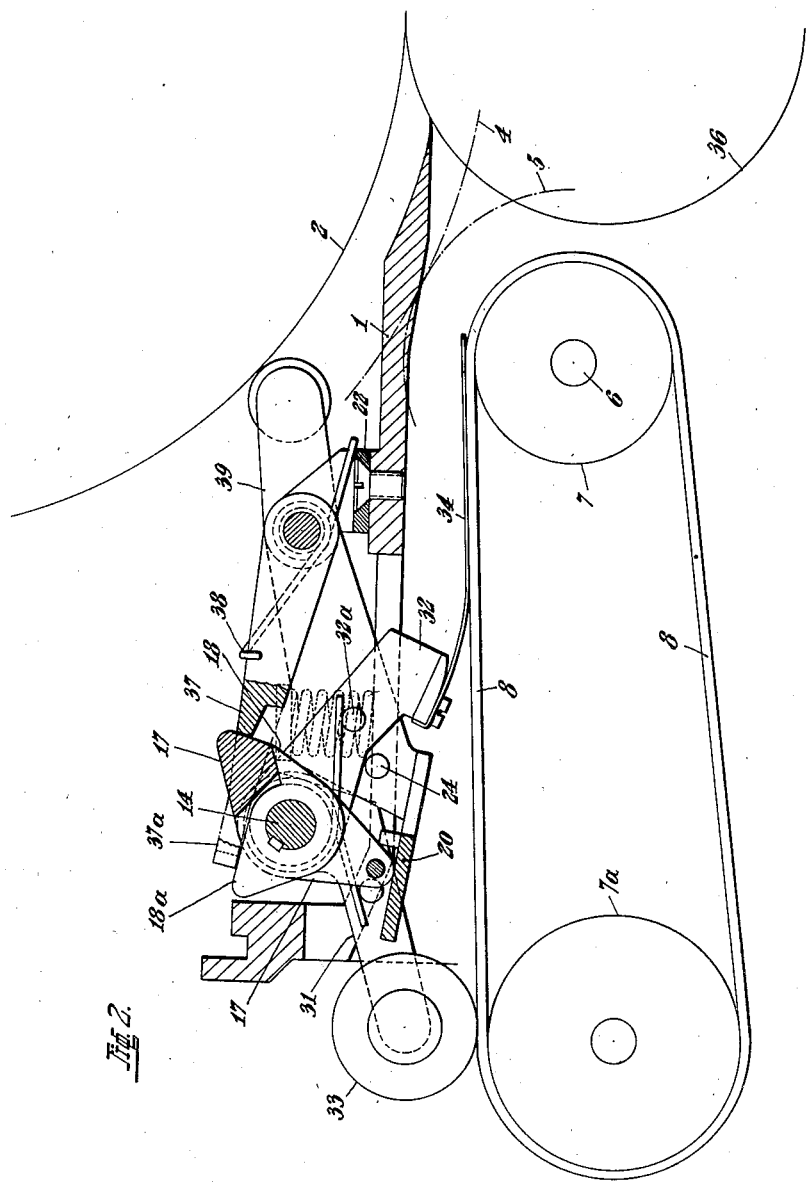

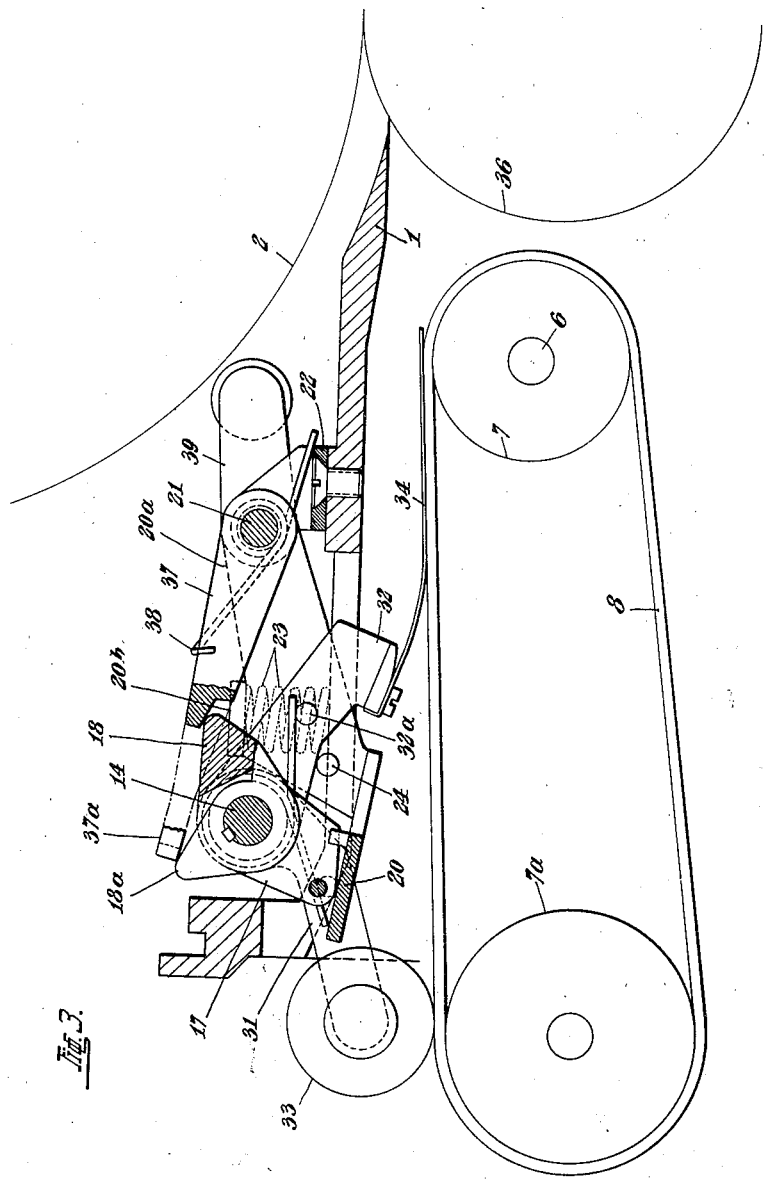

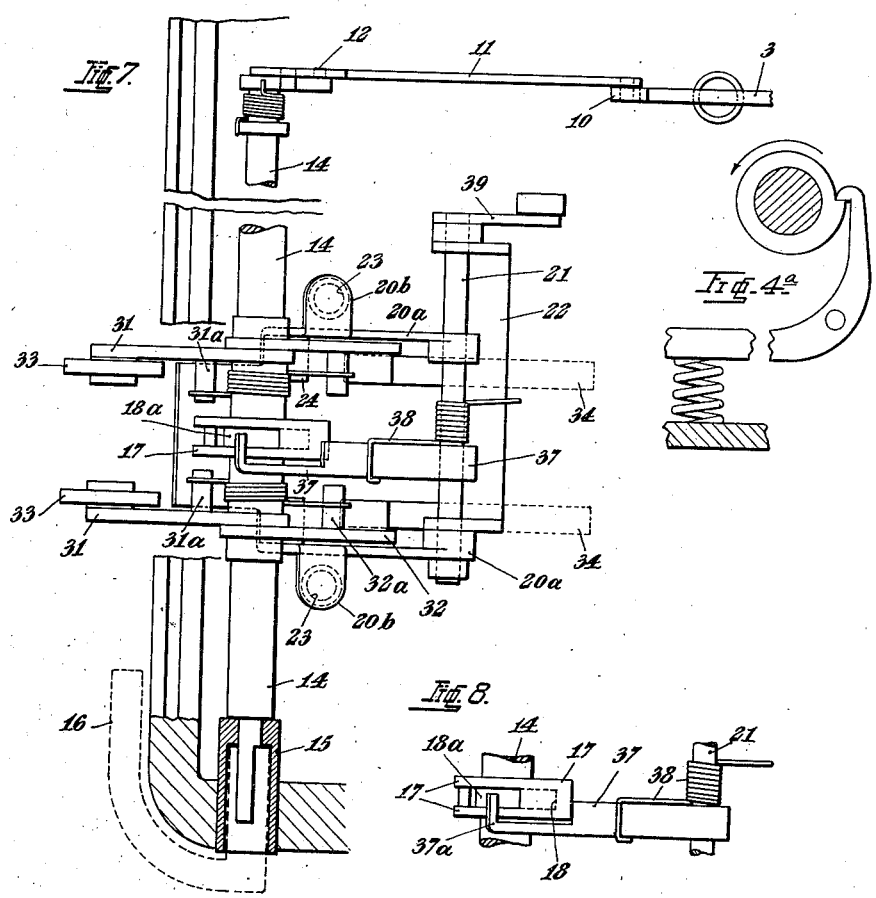

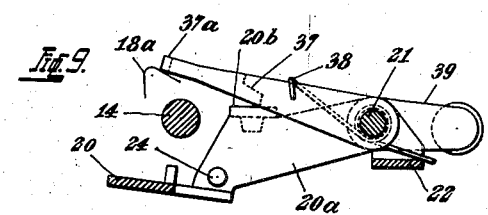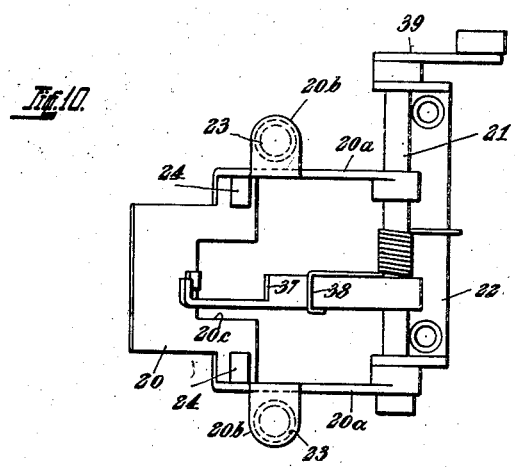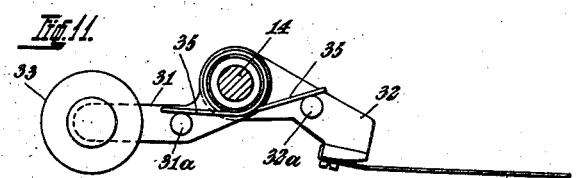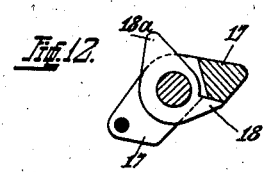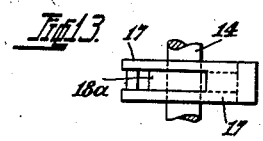

2,107,618

UNITED STATES PATENT OFFICE 2,107,618

MACHINE FOR POSTMARKING AND LIKE PURPOSES

Walter Ochsenbein, Bern, Switzerland, assignor to Hasler A.-G. Werke für Telephonie & Prazisionsmechanik, Bern, Switzerland Application May 29, 1936, Serial No. 82,663
In Switzerland July 3, 1935

7 Claims. (Cl. 101—235)

My invention relates to machines for postmarking and like purposes, that is to say machines for printing or impressing marks or inscriptions on letters, cards or other documents which I shall, for convenience, generally refer to hereinafter as sheets.

The invention is concerned with machines of the kind wherein the impressions are made by means of a rotating cylinder to which the sheets are fed by an endless conveyor, the cylinder and the conveyor having a common drive, and the rotation of the cylinder being stopped automatically on completion of each revolution.

In the machines of this kind heretofore known the cylinder and conveyor generally begin to move before the conveyor is actually feeding the sheet towards the cylinder, with the result that the mark or impression is frequently not made on the sheet in the correct position.

The object of my invention is to avoid this disadvantage, and for this purpose I arrange adjacent the conveyor a presser, e. g. a pair of rollers carried by spring loaded levers, which can be caused to bear on the sheet laid on the conveyor, so as to ensure that the feed begins from a predetermined position as soon as the conveyor starts, the mechanism for unlocking the cylinder being used also to put this presser into operation and being so organized that the presser becomes operative before the unlocking is effected.

An example of apparatus according to the invention is shown in the accompanying drawings.

Figs. 1 to 3 are vertical sections, showing the movable parts in three different positions.

Fig. 4 is a vertical section on a larger scale showing the device for unlocking the cylinder.

Fig. 4ª shows the operating lever for the device for unlocking the cylinder and cooperating mechanism.

Figs. 5 and 6 are vertical sections to a larger scale showing the device for unlocking the cylinder.

Fig. 7 is a plan view, partly broken away, and Figs. 8 to 13 show various details of the apparatus.

The casing of the apparatus is not shown in the drawings, but it has therein a table 1 shown in Figs. 1, 2 and 3. Mounted above the level of this table is a marking cylinder 2, which can be rotated by hand or by means of an electromotor not shown. By means of gear wheels diagrammatically indicated at 4, 5 in Fig. 2 the cylinder rotates a shaft 6 mounted below the table. Fixed to the shaft 6 are two pulleys 7, spaced apart and these pulleys, with two pulleys 7a on a parallel shaft, carry two endless conveyor belts 8.

The cylinder is automaticaly locked by a spring loaded pawl 3 (Fig. 4) on completion of each revolution. The pawl 3 may be in the form of a bell crank lever having a locking projection at one end thereof and a resetting lug near the other end thereof, in a manner similar to the showing of Figs. 5 and 6 of my United States Patent No. 1,968,347 granted July 31, 1934. The pawl 3 is held in its locking position by a latch 10 pivoted at 9, as shown in Fig. 4. To the latch 10 is pivoted a rod 11, with a nose at its free end adapted to be engaged by one arm of a bell crank lever 13, which is fixed to a shaft 14. The lever 13 has some freedom of movement without engaging the rod 11, but by anti-clockwise rotation of the shaft 14 from the position shown in Fig. 4 the lever is caused to engage the nose (Fig. 5) and then move the rod so that it pulls the latch 10 out of engagement with the pawl 3, thus releasing the cylinder 2. The lower arm of the lever 13 carries a stud 12, which projects into a slot in the rod 11, so that it lifts the nose out of the path of the upper lever arm when the latch has been disengaged, as shown in Fig. 6.

At the end remote from the lever 13 the shaft 14 is mounted in a bearing 15 (Fig. 7), and its gudgeon in this bearing has a flat enabling it to be engaged with a key lever 16, for turning the shaft by hand.

Rotatably mounted on the shaft 14 is a finger 17, best shown in Fig. 12. This finger is forked, and between its limbs a cam 18 is fixed to the shaft. The cam 18 has a nose 18a and a tail. By means of its tail it rotates the finger 17 when the shaft 14 is rotated anti-clockwise, and the finger 17 then depresses a plate 20, which is carried by two arms 20a rotatably mounted on a horizontal shaft 21. The shaft 21 has bearings in a bracket 22 fixed to the table 1. Each of the arms 20a has an outwardly projecting lug 20b, and coiled springs 23 bear from below against these lugs, pressing the plate 20 against the finger 17. The arms 20a also have laterally projecting studs 24 near the plate 20, and between them two pairs of levers 31, 32 (Fig. 11) are rotatably mounted on the shaft 14. The levers 31 project through openings in the front wall of the casing, and outside the casing they carry rollers 33. The levers 32, projecting from the shaft 14 in the opposite direction, have fixed thereto plate springs 34, which face the belts 8, as shown in Figs. 1 to 3. Springs 35 coiled on the shaft 14 bear against studs 31a and 32a projecting from the levers 31, 32 so that these levers are pressed downwards when the plate 20 is lowered, the levers 32 being pressed against the studs 24, and the studs 31a being pressed against the plate 20. When the levers are depressed the rollers 33 and the springs 34 bear against the belts 8 or against the sheet placed thereon, as shown in Figs. 2 and 3. The springs 34 are light, so that they do not unduly impede the feed, but a considerable length thereof bears on the sheet and thus assists in guiding it till it is gripped between the cylinder 2 and a roller 36 coacting therewith.

On the shaft 21 is fixed a lever 37, and a spring 38 tends to depress this lever, which has an opening whereby it engages the finger 17 in the manner shown in Fig. 2 when the finger has depressed the plate 20 and lowered the rollers 33 on the sheet. The rollers are thus held down automatically and the key 16 can be released though it is spring loaded and normally holds the cam 13 in the position shown in Fig. 1. If from some accidental cause the feed does not proceed in the proper way it can be stopped at once by giving the key a clockwise turn by hand. This causes the nose 18a of the cam 18 to strike a lateral projection 37a of the lever 37 (Figs. 8 and 9), whereby the lever is disengaged from the finger 17 allowing the feed rollers 33 and springs 34 to be lifted by the plate 20.

Automatic lifting of the lever 37 is effected by means of a tappet on the cylinder 2, not shown in the drawings. This tappet strikes a lever 39 fixed to the shaft 21, and by this means lifts the lever 37.

The manner of operating the machine is as follows:—With the parts in the position shown in Fig. 1 the sheet to be marked, e. g., a letter, is placed on the belts 8 in such position that the part which is to receive the mark is directly below and between the rollers 33. The key 16 is then turned so that the rollers are lowered on to the letter and the springs 34 are laid upon the belts. This lowering of the rollers and springs is completed before the turning of the key causes the lever 13 to disengage the latch 10 from the pawl 3, thereby releasing the cylinder 2 so that it can be rotated by hand or by the motor.

By rotation of the cylinder 2, actuating the gears 4, 5, the conveyor belts are then driven so that the sheet is fed between the cylinder and roller 36, and the sheet receives the required impression in the proper place.

What I claim is:—

1. In a machine for postmarking or like purposes the combination of a rotatable marking cylinder, a belt conveyor actuated by rotation of said cylinder for feeding sheets to said cylinder, means whereby said cylinder is automatically locked on completion of each revolution, a movable presser for pressing a sheet upon said conveyor so as to prevent relative movement between said sheet and said conveyor when said conveyor is started, and mechanism for first actuating said presser and then unlocking said cylinder.

2. In a machine for postmarking or like purposes the combination of a rotatable marking cylinder, a belt conveyor actuated by rotation of said cylinder for feeding sheets to said cylinder, means whereby said cylinder is automatically locked on completion of each revolution, two movable pressers disposed in series alongside said conveyor for pressing a sheet upon said conveyor and preventing relative movement between said sheet and said conveyor in the course of the feed, and mechanism for first actuating said pressers and then unlocking said cylinder.

3. In a machine for postmarking or like purposes the combination of a rotatable marking cylinder, a belt conveyor actuated by rotation of said cylinder for feeding sheets to said cylinder, means whereby said cylinder is automatically locked on completion of each revolution, two movable pressers disposed in series alongside said conveyor for pressing a sheet upon said conveyor so as to prevent relative movement between said sheet and said conveyor in the course of the feed, and mechanism for first actuating said pressers and then unlocking said cylinder, said pressers being respectively a roller device at the receiving end of the conveyor and a plate spring device at the delivery end of the conveyor.

4. In a machine for postmarking or like purposes the combination of a rotatable marking cylinder, a belt conveyor actuated by rotation of said cylinder for feeding sheets to said cylinder, means whereby said cylinder is automatically locked on completion of each revolution, a lever and a roller carried by said lever, for pressing a sheet upon said conveyor so as to prevent relative movement between said sheet and said conveyor when said conveyor is started, and mechanism for first actuating said lever and then unlocking said cylinder.

5. In a machine for postmarking or like purposes the combination of a rotatable marking cylinder, a belt conveyor actuated by rotation of said cylinder for feeding sheets to said cylinder, means whereby said cylinder is automatically locked on completion of each revolution, spring loaded pressure means for pressing a sheet upon said conveyor and preventing relative movement between said sheet and said conveyor while said conveyor is in operation, a spring supported plate whereby said pressure means are normally held out of operation, a shaft, and mechanisms actuated by said shaft, by rotation thereof in one direction, for first depressing said plate to allow said pressure means to come into operation and then unlocking said cylinder to allow rotation thereof.

6. In a machine for postmarking or like purposes the combination of a rotatable marking cylinder, a belt conveyor actuated by rotation of said cylinder for feeding sheets to said cylinder, means whereby said cylinder is automatically locked on completion of each revolution, spring loaded pressure means for pressing a sheet upon said conveyor so as to prevent relative movement between said sheet and said conveyor while said conveyor is in operation, a spring supported plate whereby said pressure means are normally held out of operation, a rotatable shaft, a finger rotatably mounted on said shaft, a cam fixed to said shaft for first actuating said finger to depress said plate and allow said pressure means to come into operation, and mechanism actuated by said shaft for unlocking said cylinder after said plate has been depressed by said finger.

7. In a machine for postmarking or like purposes the combination of a rotatable marking cylinder, a belt conveyor actuated by rotation of said cylinder for feeding sheets to said cylinder, means whereby said cylinder is automatically locked on completion of each revolution, pressure means for pressing a sheet upon said conveyor so as to prevent relative movement between said sheet and said conveyor while said conveyor is working, a rotatable shaft, a finger rotatably mounted on said shaft and adapted to actuate said pressure means, a cam fixed to said shaft adapted to actuate said finger when said shaft is rotated in one direction, a spring loaded lever controlled by said cam, adapted to engage and lock said finger when said finger has actuated said pressure means, and adapted to be disengaged from said finger by rotation of said shaft in the opposite direction, and mechanism actuated by said shaft for unlocking said cylinder after actuation of said finger by said shaft.

WALTER OCHSENBEIN.